US008058595B2

(12) United States Patent
Koehler et al.

(10) Patent No.: US 8,058,595 B2
(45) Date of Patent: Nov. 15, 2011

(54) COLLAPSIBLE SHAPE MEMORY ALLOY (SMA) NOSE CONES FOR AIR VEHICLES, METHOD OF MANUFACTURE AND USE

(75) Inventors: Frederick B. Koehler, Tucson, AZ (US);
Ward D. Lyman, Tucson, AZ (US);
Terry M. Sanderson, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 814 days.

(21) Appl. No.: 12/141,426

(22) Filed: Jun. 18, 2008

(65) Prior Publication Data
US 2009/0314890 A1    Dec. 24, 2009

(51) Int. Cl.
*B64C 7/00*    (2006.01)
(52) U.S. Cl. ............. 244/3.1; 244/121; 244/133
(58) Field of Classification Search ....... 244/121.117 R, 244/133, 3.1; 89/1.801, 1.816
See application file for complete search history.

(56) References Cited

U.S. PATENT DOCUMENTS

| | | | | |
|---|---|---|---|---|
| 4,549,464 A | * | 10/1985 | Hawkins et al. | 244/3.1 |
| 4,808,246 A | * | 2/1989 | Albrecht et al. | 148/527 |
| 5,463,957 A | * | 11/1995 | Jensen et al. | 244/3.1 |
| 5,662,294 A | * | 9/1997 | Maclean et al. | 244/133 |
| 6,388,184 B1 | * | 5/2002 | Glenning | 244/3.1 |
| 6,748,871 B2 | * | 6/2004 | Hellman | 244/3.27 |
| 6,989,197 B2 | * | 1/2006 | Schneider | 428/416 |
| 7,393,595 B2 | * | 7/2008 | Chandrasekaran et al. | 428/614 |
| 7,854,391 B2 | * | 12/2010 | Jiang et al. | 236/101 A |
| 2002/0014992 A1 | * | 2/2002 | Sun et al. | 343/700 MS |
| 2007/0138341 A1 | * | 6/2007 | Joshi et al. | 244/129.1 |
| 2007/0202296 A1 | * | 8/2007 | Chandrasekaran et al. | 428/124 |

* cited by examiner

*Primary Examiner* — Galen Barefoot
(74) *Attorney, Agent, or Firm* — Eric A. Gifford

(57) ABSTRACT

A nose cone formed from a shape memory alloy (SMA) having a recoverable strain of at least 2% collapses about the dome for storage, deploys at launch to protect the sensor dome and reduce drag during atmospheric flight and is shed to allow sensing for terminal maneuvers. The SMA is shape-set at elevated temperatures in its Austenite phase with a memorized shape having a radius of curvature greater than that of the sensor dome to reduce aerodynamic drag. The temperature is reduced and the SMA collapsed to conform to the curvature of the sensor dome within the recoverable strain for storage. A first mechanism is configured to return the collapsed SMA to its memorized shape at launch or prior to going supersonic. In one embodiment, the SMA is stored below its Martensite finish temperature in a temperature-induced Martensite phase in which case the mechanism heats the SMA above the Austenite finish temperature to return the material to its memorized shape. In another embodiment, the SMA is stored above its Austenite finish temperature in which case collapsing the SMA places the material in a strain-induced Martensite phase. The mechanism holds the collapsed SMA in place and the releases the stored energy allowing the SMA to return to the memorized shape.

26 Claims, 8 Drawing Sheets

COLLAPSIBLE SHAPE MEMORY ALLOY (SMA) NOSE CONES FOR AIR VEHICLES, METHOD OF MANUFACTURE AND USE

BACKGROUND OF THE INVENTION

1. Field of the Invention

This invention relates to air vehicle nose cones that are collapsible for storage, deploy at launch to protect the vehicle's dome and reduce drag and release to allow the vehicle seeker to image the scene during terminal flight maneuvers. The nose cones are particularly applicable to supersonic missiles and smart projectiles to protect the seeker dome and reduce drag.

2. Description of the Related Art

Air vehicles such as missiles and more recently some smart projectiles include seekers that guide them to their target. These seekers typically include IR sensors and may also include visible sensors or RF antennas. These sensor components are protected from the atmosphere by a dome. In order to allow electromagnetic radiation of the desired wavelength to pass through the dome, the dome must be constructed of certain materials and with a certain blunt shape (e.g. hemispheric). These dome materials are susceptible to damage during normal pre-flight handling. Furthermore, the optical properties of these dome materials tend to degrade during flight through the atmosphere. In addition, the blunt nose of the dome produces considerable aerodynamic drag particularly at supersonic speeds.

To protect the vehicle 'pre-flight', a conformal hard cover is placed over the dome and the vehicle is placed inside a tube for ground, sea or air-based launch. At launch, meaning just prior to to just after launch, the cover is blown off of the vehicle using pyro charges. One design uses an expanding mandrel that pushes the cover off shearing rivets that hold the cover to the vehicle. In another design, a squib is fired that opens the cover like a clam shell allowing the two halves to split apart starting at the tip and fall away from the vehicle. This approach provides no protection of the dome during atmospheric flight or reduction in drag from launch to the point where the seeker activates to image the scene.

In certain space-based applications such as Exoatmospheric Kill Vehicle (EKV) and Standard Missile 3, sensor packages are provided for space-based imaging. Because sensing is only performed in space a dome is not required to protect the sensor, hence is not included. The Standard Missile 3 and the carrier vehicle for the EKV include a pointed nose cone that protects the sensor packages during atmospheric flight and reduces drag. Once in space, the nose cone is jettisoned to allow the sensor packages to operate.

SUMMARY OF THE INVENTION

The present invention provides a nose cone that collapses about the seeker dome for storage, deploys at launch to a memorized shape to protect the dome and reduce drag during atmospheric flight and is shed to allow sensing for terminal maneuvers.

This is accomplished by forming the nose cone from a shape memory alloy (SMA) having a recoverable strain of at least 2%. The SMA is shape-set at elevated temperatures in its Austenite phase with a memorized shape having a radius of curvature greater than that of the sensor dome to reduce aerodynamic drag. The temperature is reduced and the SMA collapsed to conform to the curvature of the sensor dome within the recoverable strain for storage. Allowing the SMA to twist as it collapses reduces the strain. The SMA may form the outer skin of the nose cone, a skeleton of structural wires that support the outer skin or both. A first mechanism is configured to return the collapsed SMA to its memorized shape, typically at launch but possibly at any point prior to the vehicle going supersonic in one embodiment, the SMA is stored below its Martensite finish (Mf) temperature in a temperature-induced Martensite phase in which case the mechanism heats the SMA above the Austenite finish (Af) temperature to return the material to its memorized shape. Alternately, the atmospheric heating of the nose cone during flight may be used to trigger the phase change. In another embodiment, the SMA is stored above its Austenite finish temperature in which case collapsing the SMA places the material in a strain-induced Martensite phase. The mechanism holds the collapsed SMA in place and then releases the stored energy allowing the SMA to return to the memorized shape. A second mechanism is configured to shed the nose cone. This mechanism may be a collar that simply releases the nose cone intact. Alternately, burn wires may be used to hold the structural wires or outer skin together during flight. The burn wires are ignited and the collar retracts or segments to shed the outer skin and structural wires.

These and other features and advantages of the invention will be apparent to those skilled in the art from the following detailed description of preferred embodiments, taken together with the accompanying drawings, in which:

DETAILED DESCRIPTION OF THE INVENTION

The present invention addresses the problem of protecting an air vehicle's seeker dome and reducing drag in-flight prior to imaging of the scene during terminal maneuvers without increasing the volume of the seeker assembly or air vehicle during storage. Protection and reduced aerodynamic drag could be realized with a solid pointed nose cone that is jettisoned prior to terminal maneuvers. However, the nose cone cannot extend past the end of the launch tube due to potential damage during storage and handling and strict space constraints. The arsenal includes many air vehicles, tubes and launch platforms with known designs that can be used together in different system configurations. There is strong resistance against reconfiguring one or more of these components to incorporate such a nose cone in either a retrofit or new design. A reduction in vehicle volume would affect payload, guidance, propulsion etc. An increase in tube volume changes the tube and may affect the launch platform. Furthermore any redesign would require requalification of the component and would be expensive. The present invention describes a nose cone formed from a shape memory alloy (SMA) that collapses about a sensor dome for storage, deploys at launch to a memorized shape to protect the seeker dome and reduce drag during atmospheric flight and is shed to allow sensing for terminal maneuvers of the flight vehicle. The nose cone may be retrofit to the existing arsenal of air vehicles or integrated into new designs without necessitating changes in the tubes or launch platforms.

Figure 1:
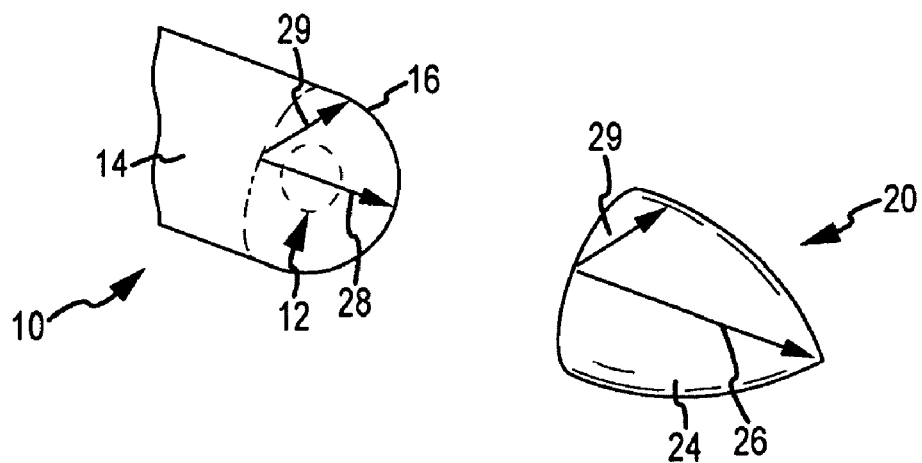
FIG. 1 is a diagram of a collapsible shape memory alloy (SMA) nose cone for protecting the dome of an air vehicle.

As illustrated in FIG. 1, an air vehicle 10 such as a missile or smart projectile includes a seeker 12 mounted on an airframe 14 that images a scene through a protective dome 16 to perform guidance maneuvers. The seeker is typically mounted on a gimbal to rotate about one or more axes to acquire and track a target. The seeker typically operates within the IR band at one or more wavelengths. The seeker may be configured to operate in the RF or visible bands instead of or in addition to the IR band. The seeker may be passive, semi-active or active. The seeker is typically used for terminal guidance maneuvers once the vehicle is close enough to acquire and track the target. Dome 16 protects the seeker's sensors and optics from the atmosphere during flight. The dome is constructed from materials and with a blunt nose, typically hemispheric, to pass electromagnetic radiation in the sensor bands(s) with minimal loss and distortion. These materials or optical properties of those materials are susceptible to degradation during flight. Seeker and dome design, construction and operation are well known in the relevant art.

A nose cone 20 formed at least in part from a SMA is placed over dome 16. The SMA has a recoverable strain of at least 2% that allows the nose cone to be collapsed to conform to the blunt shape of dome 16 without permanent deformation for storage and to return to its memorized shape, typically at launch but possibly at after launch before going supersonic. Standard spring materials such as steel exhibit a recoverable strain of approximately 0.5% and at most 1% and thus are not suitable for this application. Furthermore conventional spring materials do not have the shape-set memory properties of SMAs. The nose cone includes an outer skin 24 (e.g. a metal foil) that protects the dome from the atmosphere. The nose cone is "shape-set" with a memorized shape having a radius of curvature 26 greater than the radius of curvature 28 of the sensor dome so that the nose cone is more pointed than the blunt dome and thus exhibits less aerodynamic drag in atmosphere.

The shape of the nose cone can be generally described as that of an ogive ("Oh-jive") which is a curved shape, figure, or feature. In ballistics or aerodynamics, an ogive is a pointed, curved surface mainly used to form the approximately streamlined nose of a bullet, shell, missile or aircraft. The traditional or secant ogive is a surface of revolution of the same curve that forms a Gothic arch; that is, a circular arc, of greater radius than the diameter of the cylindrical section ("shank"), is drawn from the edge of the shank until it intercepts the axis. If this arc is drawn so that it meets the shank at zero angle (that is, the distance of the centre of the arc from the axis, plus the radius of the shank, equals the radius of the arc), then it is called a tangential or spitzer ogive. This is a very common ogive for high velocity (supersonic) rifle bullets. The sharpness of this ogive is expressed by the ratio of its radius 28 to the diameter 29 of the cylinder; a value of one half being a hemispherical dome, and larger values being progressively more pointed. Values of 4 to 10 are commonly used in rifles, with 6 being the most common. Assuming dome 16 is hemispherical having a ratio of one-half, the memorized shape of nose cone 20 will have a ratio greater than one-half. Another common ogive for bullets is the elliptical ogive. This is a curve very similar to the spitzer ogive, except that the circular arc is replaced by an ellipse defined in such a way that it meets the axis at exactly 90°. This gives a somewhat rounded nose regardless of the sharpness ratio. An elliptical ogive is normally described in terms of the ratio of the length of the ogive to the diameter of the shank. A ratio of one half would be, once again, a hemisphere. Values close to 1 are common in practice. Elliptical ogives are mainly used in pistol bullets. Missiles and aircraft generally have much more complex ogives, such as the von Kármán ogive. In all cases, the radius of curvature 26 of the nose cone or ogive is greater than the radius of curvature 28 of the dome.

Figure 2:
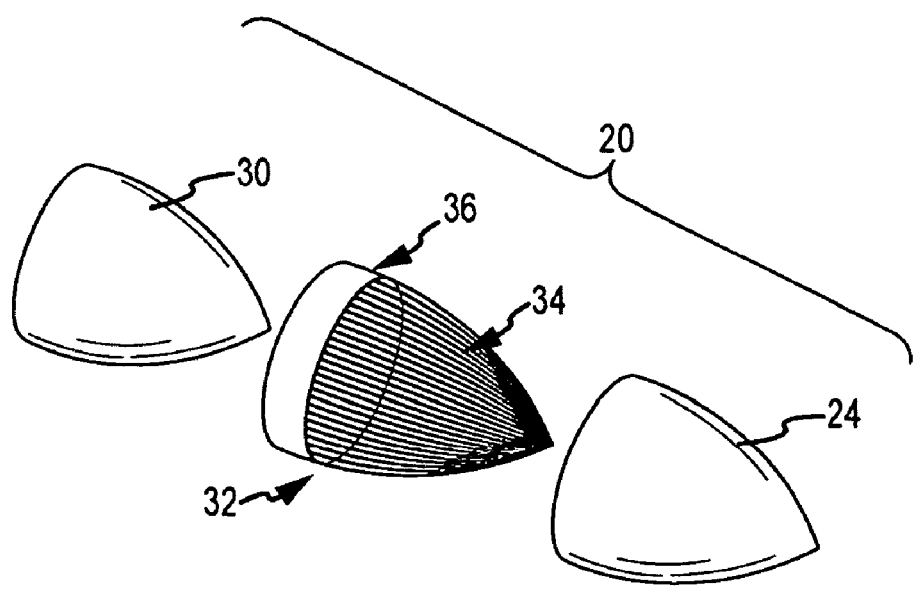
FIG. 2 is a diagram of an exploded view of an embodiment of the SMA nose cone.

An embodiment of nose cone 20 sans the mechanisms for returning the collapsed SMA to the memorized shape or for shedding the nose cone is depicted in FIG. 2. Various embodiments for those mechanisms are depicted in FIGS. 6a-6c and 8 and 9, 10, 11a-11b and 12, respectively. At a minimum nose cone 20 must include outer skin 24 to protect the dome from the atmosphere. If the outer skin is formed from a SMA no other structural components may be required. An inner skin 30 is suitably provided between the metal outer skin 24 and the dome to protect the surface of the dome during storage, deployment and shed. A fabric or polymer that will not scratch, e.g. Nomex®, Kevlar®, or Teflon®, is appropriate.

In other embodiments, it may be desirable to form the outer skin 24 over (or under) a skeleton 32 of structural wires 34 formed from a SMA. Separating the structural SMA properties from the protective outer skin properties provides the designer with additional freedom to optimize the design for shape, strength, rigidity, weight, protection of the dome, etc. The outer skin can be selected to be thin and light weight and protect the dome without structural considerations. In this configuration outer skin 24 may be a SMA shape-set with the same shape, a non-shape-set SMA to exploit the large deformation range of the alloy or another material that can collapse and deploy with the skeleton. For example, an outer skin material that would exceed its deformation range when collapsed could, if weak enough (a thin foil), be driven to the deployed position by the strength and rigidity of the skeleton. All other considerations being equal, one would typically prefer the outer skin to be formed from a SMA but it is not necessary. For example a Nitonol foil a couple mils thick should suffice to protect the dome from the atmosphere if the structural support is provided by the skeleton. If not, a much thicker foil may be required. Nitonol is currently the most widely available SMA.

As depicted, skeleton 32 includes a collar 36 that mounts around and aft of the sensor dome and a plurality of structural wires 34 formed of the SMA anchored at one end around the circumference of the collar (either clamped between the collar and vehicle or embedded in the collar) to extend forward about the sensor dome shape-set to form a wire skeleton of the memorized shape. As shown the structural wires 34 are oriented in a longitudinal direction about the long axis of the vehicle with their opposing ends shaped to a point at the tip of the nose cone. The skeleton may be formed from different configurations of structural wires as long as the strain deformation and shape memory properties are retained. The selection of the SMA, its specific composition to set the Austenite finish (Af) and Martensite finish (Mf) temperatures, the number of wires, diameter of the wires and wire pattern determine the properties of the nose cone. For example, the diameter of wire can be changed to optimize strain levels. Thinner wires will decrease strain given a fixed forced displacement. Thinner diameter wires can be offset by increasing the number of wires. The Af and Mf temperatures must be tuned for the operating temperature of the air vehicle. How the Af and Mf temperatures are tuned depends on the mechanism used to recover the memorized shape as will be discussed below. The alloy could be chosen based on needed properties and availability, e.g. Nitinol has greater availability, however, aluminum copper has greater capabilities with respect to strain.

Figure 3D:
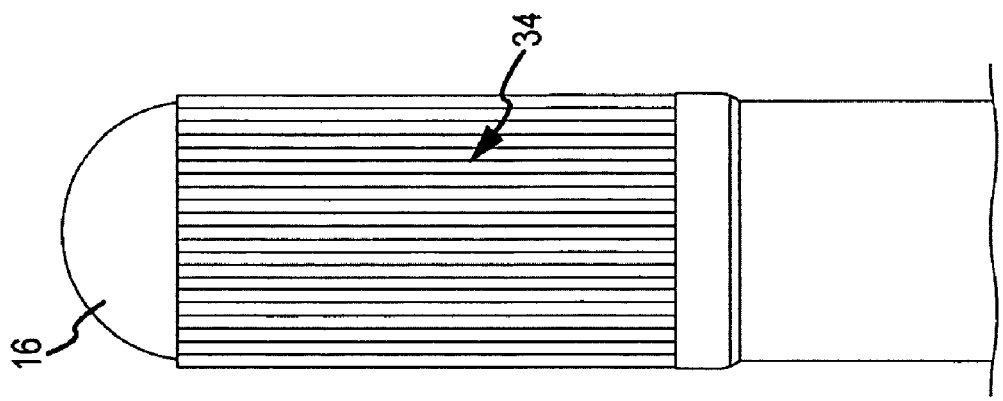
FIGS. 3a-3d are a sequence of diagrams illustrating the shape-setting of the SMA nose cone, collapsing of the nose cone to the dome for storage, deployment of the nose cone into its memorized shape at launch and displacement of the nose cone at terminal maneuvers to allow the seeker to image a scene through the dome.
Figure 3C:
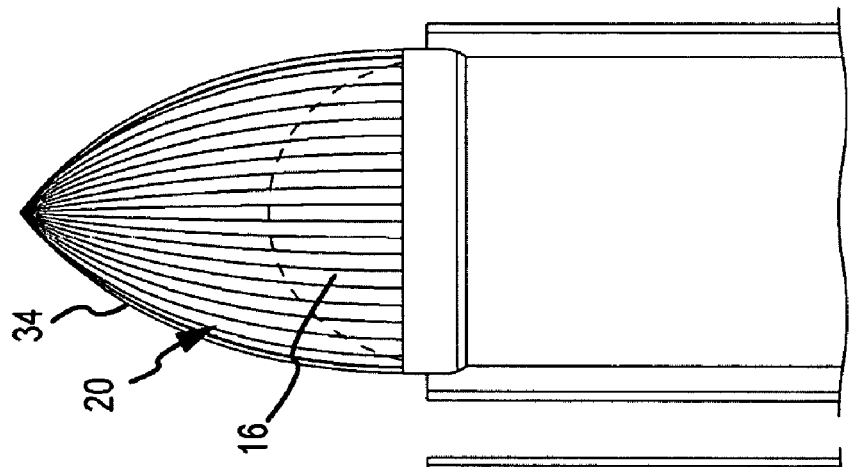
Figure 3B:
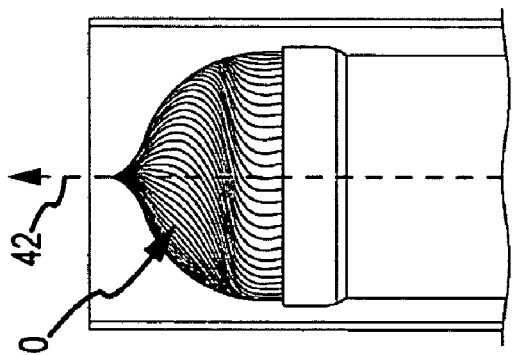
Figure 3A:
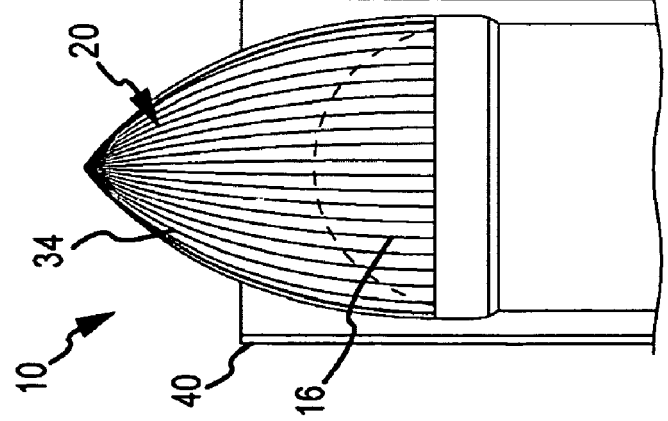

A representative launch sequence of air vehicle 10 fitted with nose cone 20 to protect seeker dome 16 and to reduce drag is depicted in FIGS. 3a through 3d (without outer skin 24). As shown in FIG. 3a, nose cone 20 is mounted with its memorized shape on air vehicle 10 over dome 16 inside a launch tube 40. The nose cone may be mounted either prior to placing the vehicle in the tube or thereafter, typically prior due to the limited space within the launch tube. The tip of the deployed nose cone extends beyond the end of the launch tube. The nose cone cannot remain in the deployed state for several reasons including that the end of the launch tube is typically covered with a soft or hard cover, the nose cone may be damaged during storage or handling and severe space constraints on storage, transportation and/or the launch platform. As shown in FIG. 3b, nose cone 20 is collapsed to conform to the shape of dome 16 and fit into the volume of the tube in a collapsed state. The end of the launch tube is typically covered with a soft or hard cover. The amount of strain induced must not exceed the recoverable range of the SMA. One approach to collapsing the nose cone is to compress along and twist around the long axis 42 of the vehicle. This allows the nose cone to collapse a considerable amount without exceeding the strain deformation range. Consequently, nose cone geometries that are longer and more pointed can be supported.

As shown in FIG. 3c, at launch, meaning just prior to to just after launch of the air vehicle, the collapsed SMA is returned from its collapsed state to its deployed state and memorized shape. "Launch" being the point at which the vehicle's own propulsion system, as in the case of a missile, is ignited or the point at which the launch platform fires the vehicle, as in the case of a gun-launched projectile. In either case, the nose cone preferably reduces aerodynamic drag from the time of launch until the seeker is initiated. Deployment of the nose cone to its more aerodynamic shape could be delayed until some time after launch. The nose cone would still protect the dome but would not realize the aerodynamic benefits. For example, nose cone deployment could, in some instances, be delayed until the air vehicle reached a certain threshold speed e.g. supersonic. As shown in FIG. 3d, when the air vehicle reaches its terminal guidance phase the nose cone is shed to allow the seeker to see through the dome and image a scene to, for example, acquire and track a target to impact. As will be described below, the nose cone may be shed by either retracting the outer skin and the structural wires if they exist aft of the dome as shown in FIG. 3d, jettisoning the nose cone in segments or by jettisoning the entire nose cone intact.

Figure 4:
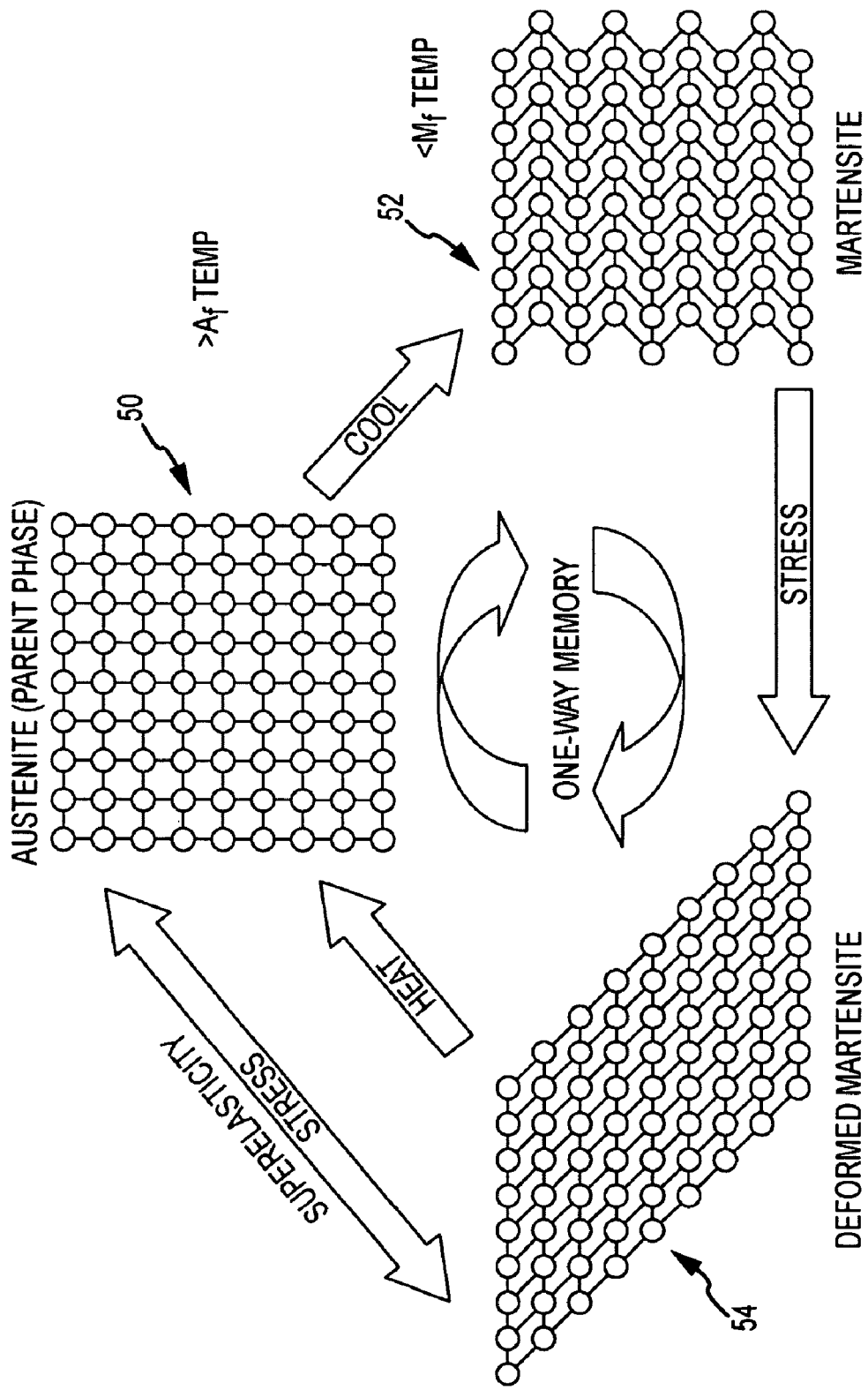
FIG. 4 is a diagram illustrating the temperature or strain induced phase transitions of shape memory alloys.
Figure 5:
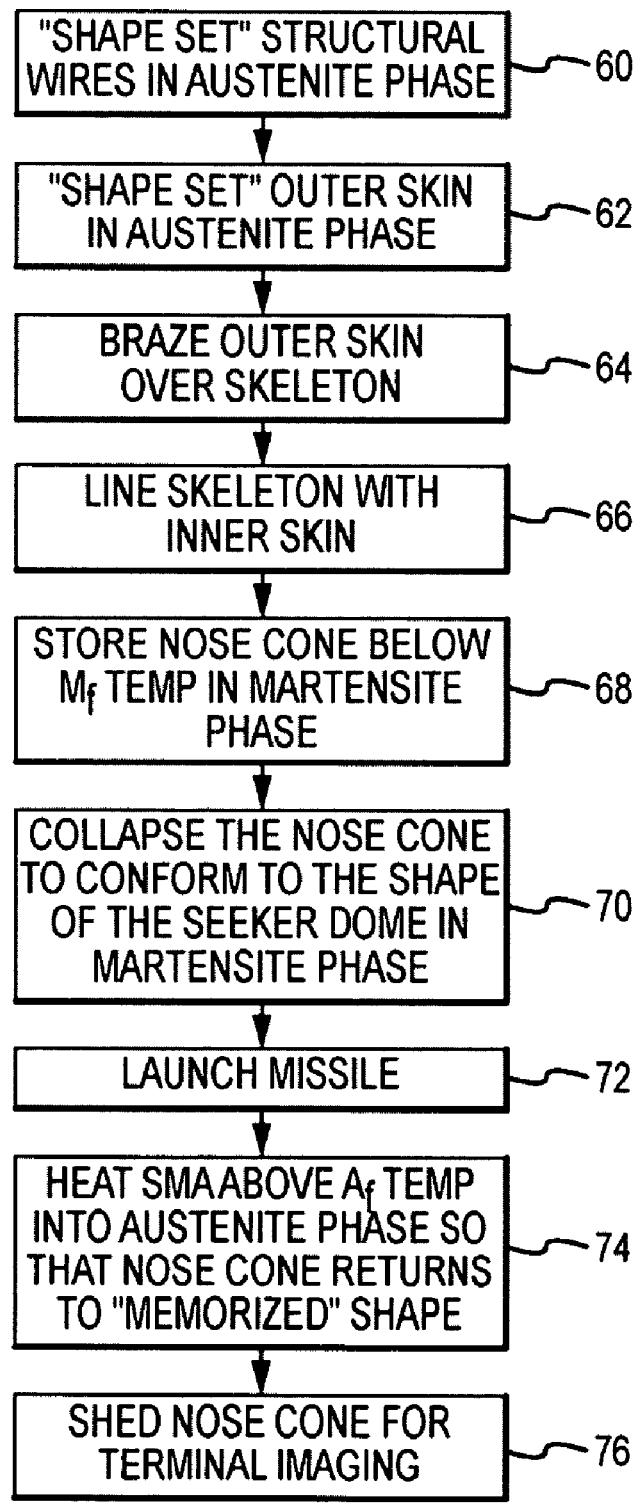
FIG. 5 is a flow diagram of an embodiment for the manufacture and use of a SMA nose cone in which the phase change to return the SMA to its memorized shape is temperature induced.

The shape-memory and super-elastic properties of shape memory alloys are illustrated in the phase transition diagram of FIG. 4. These alloys are characterized by a recoverable strain of at least 2%, more typically approximately 4% and up to 8% or higher. Nitonol and Aluminum copper are the most prevalent alloys and have a recoverable strain of about 8%. Other candidate alloys include the following: (1) Ag—Cd 44/49 at. % Cd, (2) Au—Cd 46.5/50 at. % Cd, (3) Cu—Al—Ni 14/14.5 wt. % Al and 3/4.5 wt. % Ni, (4) Cu—Sn approx. 15 at. % Sn, (5) Cu—Zn 38.5/41.5 wt. % Zn, (6) Cu—Zn—X (X=Si, Al, Sn), (7) Fe—Pt approx. 25 at. % Pt, (8) Mn—Cu 5/35 at. % Cu, (9) Fe—Mn—Si, (10) Pt alloys, (11) Co—Ni—Al, (12) Co—Ni—Ga, (13) Ni—Fe—Ga, (14) Ti—Pd in various concentrations and (15) Ni—Ti (~55% Ni). A more complete description of SMAs is found in Materials Properties Handbook: Titanium Alloys, 1994, T. W. Deurig & A. R. Pelton, ISBN 10:0-87170481-1 ISBN 13: 978-0-87170481-8

The alloys are characterized by an "Austenite" or parent phase 50 in which the alloy is characterized by its high strength and more rigid properties and a "Martensite" phase 52 or deformed Martensite phase 54 in which the alloy is characterized by its soft and plastic-like properties. The transition between phases can be either temperature or strain induced. Ignoring strain, at temperatures above the Af temperature the alloy is in the Austenite phase and at temperatures below the Mf temperature the alloy is in its Martensite phase. Typically, the Af temperature is approximately 10-20 C. above the Mf temperature. At temperatures above the Af temperature, if the alloy is deformed the local strain can place the alloy in its Martensite phase. The alloy is "shape-set" at an elevated temp (e.g. 500 C. for Nitonol) to memorize a desired shape in the Austenite phase. From this common starting point the alloy can be used in either of two regimes; the shape-memory regime or the super-elastic regime.

In the shape-memory regime, once shape-set the alloy is cooled to below the Mf temperature into its Martensite phase 52. In the Martensite phase the alloy can be deformed within the recoverable strain of the alloy and will stay in the deformed Martensite phase 54. Although the alloy is stressed by the deformation, the deformed shapes have approximately the same energy as the set shape and thus the alloy will stay in the deformed shape. However the alloy "remembers" the shape set during the Austenite phase. The application of heat to raise the temperature above the Af temperature changes the phase from Martensite back to the Austenite parent phase 50. In the Austenite phase the alloy returns to the shape set in memory (e.g. the low energy state in that phase). As long as the deformation is within the recoverable strain, the application of heat to raise the temperature above the Af temperature will allow the alloy to recover the shape set in memory.

In the super-elastic regime, the alloy is designed so that the cooled storage or operating temperatures are above the Af temperature and the alloy remains in its Austenite phase 50. In the Austenite phase, the alloy can be deformed into a different shape, but will be at a higher energy in the deformed Martensite phase 54 (the phase will actually change locally from Austenite to Martensite due to strain). However, the alloy wants to be in the Austenite phase at this temperature and will do so as soon as the forced displacement is removed. In this regime, some sort of clamp is required to hold the alloy in its deformed shape. When the clamp is released the alloy will return to the memorized shape in the Austenitic phase 50. The use of a SMA in its super-elastic regime differs from a conventional spring not only in the much greater strain deformation range but also in the exploitation of the alloy's shape-set properties.

Both regimes exhibit the shape-set and super-elastic properties of the SMA. The ability to induce phase transitions by controlling temperature is used in the shape-memory regime. The ability to induce phase transitions by controlling stress is used in the super-elastic regime. These different regimes are exploited as described in FIGS. 5 and 6a-6c and 7 and 8 to form a collapsible nose cone that can return to its memorized shape.

A method of manufacture and use of a SMA nose cone in the shape-memory regime is illustrated in FIGS. 5 and 6a through 6c. In this example, both the structural wires and outer skin are formed from a SMA alloy. The structural wires and outer skin are shape set around a replica of the seeker dome in their Austenite phase at an elevated temperature (steps 60 and 62). The outer skin is placed over the wire skeleton and affixed to the skeleton by, for example, brazing the metal foil to the metal wires (step 64). The skeleton is lined with an inner skin to protect the dome (step 66). Alternately, the inner skin could be placed over the dome itself; either approach provides the requisite protection as long as the inner skin is removed when the nose cone is shed.

The assembled nose cone is stored in its deployed or memorized shape at a temperature below the alloy's Mf temperature in its Martensite phase (step 68). The alloys are designed so that the Mf temperature is safely above the range of storage temperatures or normal operating temperatures that may be encountered by the air vehicle prior to the desired deployment time. The temperature is reduced from the elevated temperatures required to shape set the alloy (e.g. approximately 500 C. for Nitonol) to below the Mf temperature. Typical storage and operating temperature ranges are −20 to 60 C. prior to launch increasing to 150 C. during flight. A typical Mf temperature for deployment at launch might be 70 C. with an Af temperature of 80-90 C.

The nose cone is removed from storage, mounted over an air vehicle's seeker dome and collapsed to conform to the shape of the dome (step 70). This process also occurs at a temperature below the Mf temperature in the alloy's Martensite phase. As described above, in the Martensite phase the alloy can be deformed within the strain deformation range and will remain in the deformed shape. The nose cone may be mounted and collapsed either before or after placing the air vehicle in the launch tube. The nose cone could be stored at a temperature above the Mf and then the temperature reduced to collapse the nose cone to the seeker dome. However, this would require different storage temperatures before and after collapsing the nose cone.

At launch (step 72) the SMA is heated to above the Af temperature (step 74) causing the alloy to transition back into the Austenite phase and the nose cone to return to the memorized shape. The heating and deployment will typically take place just prior to launch to just after launch so that the air vehicle has the reduced aerodynamic drag provided by the nose cone from launch onward. In some circumstances, it may be desirable or the system designer may elect to delay deployment of the nose cone. For example, one could delay deployment of the nose cone until the air vehicle goes supersonic without a significant loss of performance. In a typical embodiment, a mechanism for actively heating the alloy to above the Af temperature is incorporated into the nose cone (See FIGS. 6a-6c). Alternately, the Af temperature could be set so that natural heating of the nose cone as the vehicle flies through the atmosphere triggers the phase change and deployment of the nose cone. Assuming that the heating of the nose one could be accurately predicted and that the Af temperature exceeded prior to going supersonic this approach may in certain applications be viable and would not require the complication, weight and cost of a separate heating mechanism. Once the air vehicle is close enough to acquire and track its intended target, the nose cone is shed to allow the seeker to see through the dome to image a scene of the target (step 76). Different mechanisms for shedding the nose cone are described below in FIGS. 9, 10, 11a-11b, and 12.

Figure 6B:
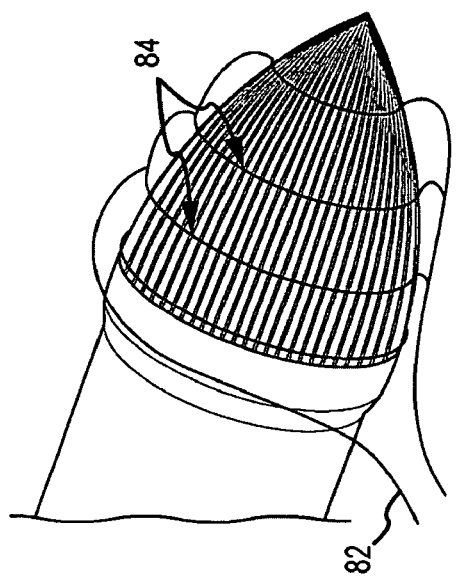
FIGS. 6a-6c are embodiments of different mechanisms for heating the SMA to return the material to its Austenite phase and memorized shape.
Figure 6C:
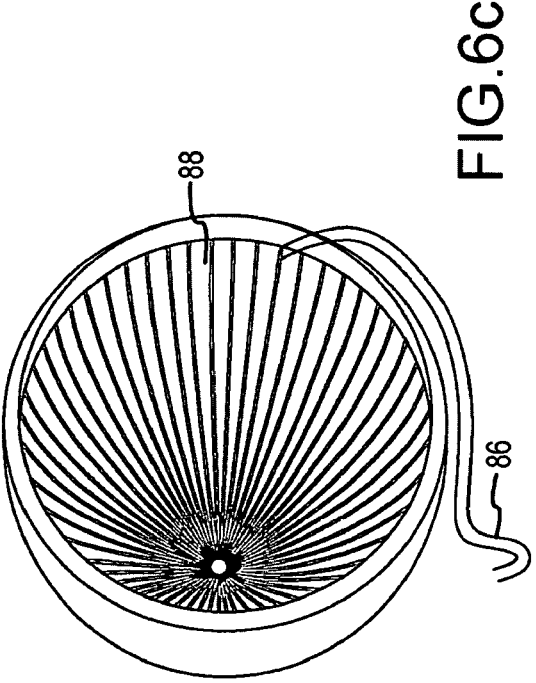
Figure 6A:
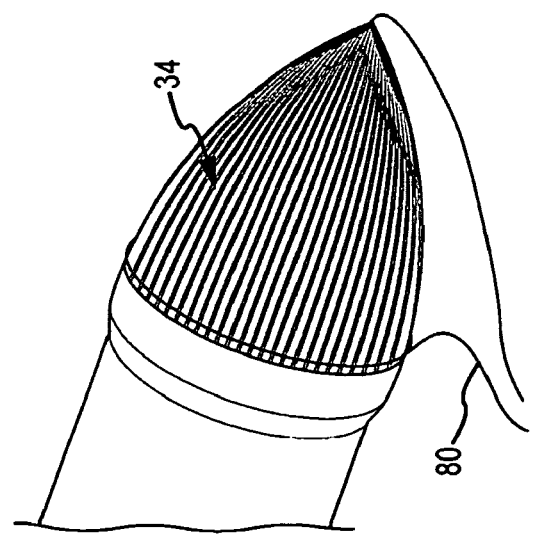

Three different mechanisms for actively heating the shape memory alloy to above the Af temperature to cause the alloy to transition from its Martensite phase (collapsed) to its Austenite phase (deployed) are depicted in FIGS. 6a-6c. Although the alloy could be designed to set an Af temperature that would allow for natural atmospheric heating of the nose cone to trigger deployment, an active heating mechanisms provides greater reliability and control over the precise time of deployment, and specifically allows for deployment at launch prior to any atmospheric heating of the nose cone. In each of these three embodiments the leads are typically routed through a through hole in the collar to a controller inside the air vehicle that provides an electrical current on the leads that is conveyed to the nose cone to heat the alloy. The controller initiates the current at launch or sometime thereafter based on the mission plan.

As shown in FIG. 6a, leads 80 are connected across the structural wires 34 to create a closed electrical circuit. The controller generates an electrical current that flows through the structural wires 34 producing direct resistive heating that raises the temperature of the structural wires (and the outer skin) above the Af temperature.

As shown in FIG. 6b, leads 82 are connected to heater wire 84 (e.g. nichrome) that is wrapped around the structural wires to create a closed electrical circuit. The controller generates an electrical current that flows through the heater wire 84 producing resistive heating that in turn heats the structural wires and outer skin to raise their temperature above the Af temperature.

As shown in FIG. 6c, leads 86 are connected to a reactive film 88 (e.g. Nanofoil®) formed on the inner surface of the skeleton to create a closed electrical circuit. A small amount of current produces a reaction that rapidly heats the structural wires and outer skin to above the Af temperature.

Figure 7:
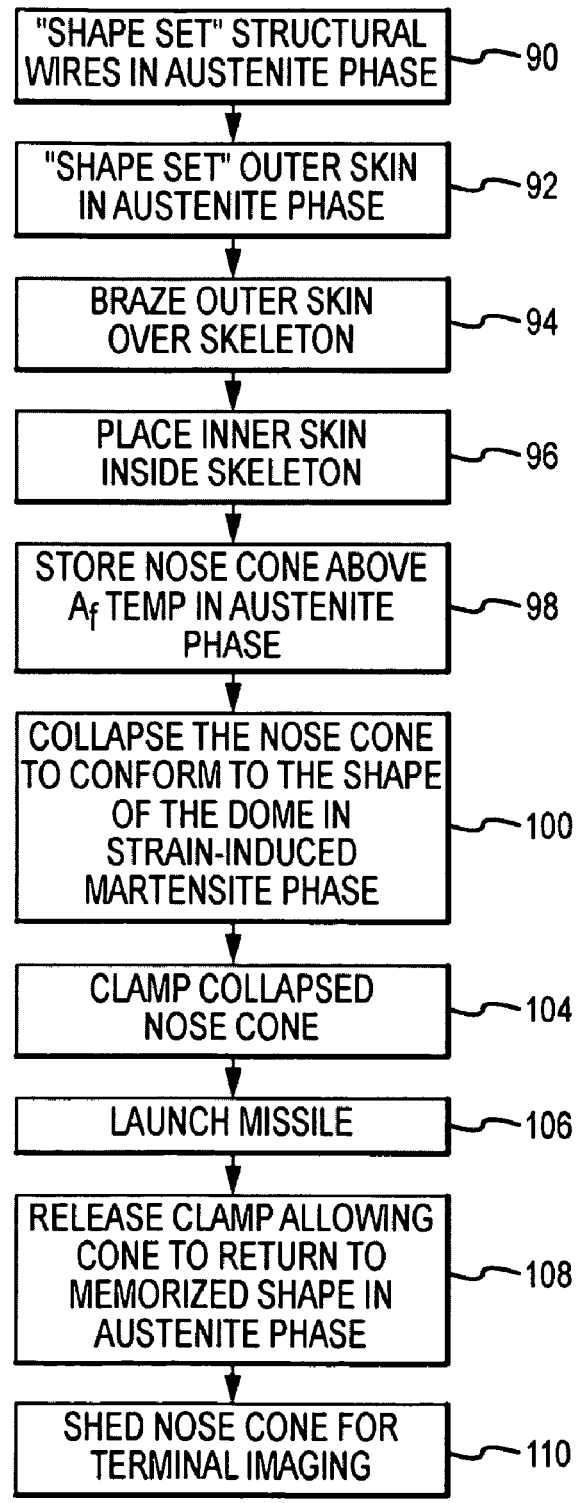
FIG. 7 is a flow diagram of an embodiment for the manufacture and use of a SMA nose cone in which the phase change to return the SMA to its memorized shape is strain induced.
Figure 8:
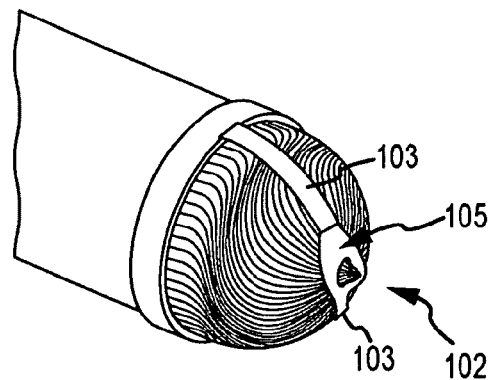
FIG. 8 is an embodiment of a means for clamping the collapsed SMA.

A method of manufacture and use of a SMA nose cone in the super-elastic regime is illustrated in FIGS. 7 and 8. In this example, both the structural wires and outer skin are formed from a SMA alloy. The structural wires and outer skin are shape set to the desired nose cone form in the Austenite phase at an elevated temperature (steps 90 and 92). The outer skin is placed over the wire skeleton and affixed to the skeleton by, for example, brazing the metal foil to the metal wires (step 94). The skeleton is lined with an inner skin to protect the dome (step 96). Alternately, the inner skin could be placed over the dome itself; either approach provides the requisite protection as long as the inner skin is removed when the nose cone is shed.

The assembled nose cone is stored in its deployed or memorized shape at a temperature above the alloy's Af temperature in its Austenite phase (step 98). The alloys are designed so that the Af temperature is safely below the range of storage temperatures or normal operating temperatures that may be encountered by the air vehicle. The temperature is reduced from the elevated temperatures required to shape set the alloy (e.g. approximately 500 C. for Nitonol) but remains above the Af temperature. Typical storage and operating temperature ranges are −20 to 60 prior to launch increasing to 150 C. during flight. A typical Af temperature might be −25 C.

The nose cone is removed from storage, mounted over an air vehicle's seeker dome and collapsed to conform to the shape of the dome at a temperature above the Af temperature (step 100). In the Austenite phase, the alloy can be deformed into a different shape, but will be at a higher energy in the deformed Martensite phase (the phase will actually change locally from Austenite to Martensite due to strain). However, the alloy wants to be in the Austenite phase at this temperature and will do so as soon as the forced displacement is removed. Therefore, a clamp 102 as illustrated in FIG. 8 is required to hold the collapsed nose cone in its deformed shape (step 104). Clamp 102 includes a pair of straps 103 attached to opposite sides of the collar and joined at the top of the collapsed nose cone by a latch 105 (e.g. a pin or burn wires). The illustrated clamp is only an embodiment; many different clamp configurations can be envisioned to hold the nose cone. The nose cone may be mounted, collapsed and clamped either before or after placing the air vehicle in the launch tube.

At launch (step 106), the clamp is released (e.g. blow the pin or ignite the burn wires) allowing the nose cone to return to its memorized shape (step 108). As before, the clamp is typically released just prior to launch to just after launch. Alternately, release of the clamp could be delayed. Once the air vehicle is close enough to acquire and track its intended target, the nose cone is shed to allow the seeker to see through the dome to image a scene of the target (step 110). Different mechanisms for shedding the nose cone are described below in FIGS. 9, 10, 11a-11b and 12. Each of these mechanisms includes a collar mountable around and aft of the seeker dome that anchors the aft end of the structural wires (or outer skin) around the circumference of the seeker dome. A controller on the air vehicle sends a signal that actuates the collar to shed the nose cone.

Figure 9:
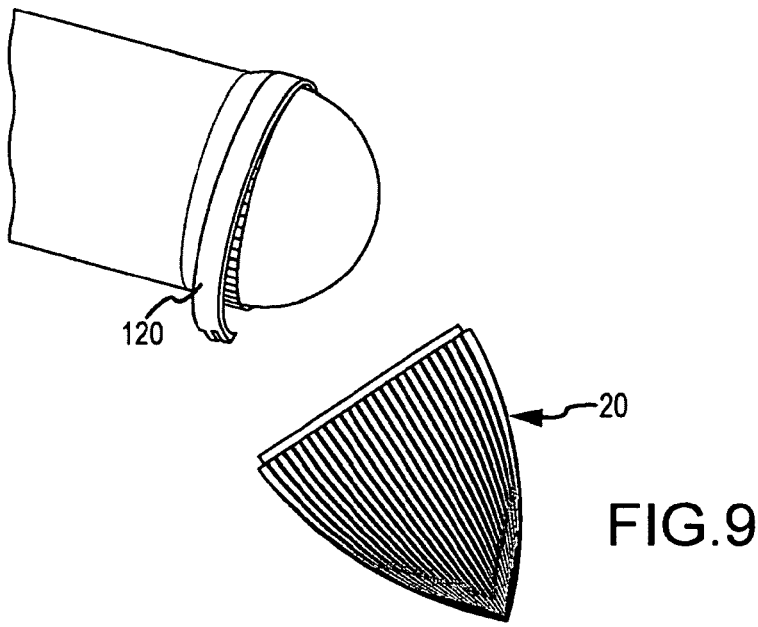
FIG. 9 is a diagram of a releasable collar for releasing the nose cone intact.

As shown in FIG. 9, a collar 120 clamps the aft end of the nose cone to secure it during flight. The controller signal might trigger a pyro device to pop a rivet or pin to release the collar allowing the nose cone to fall away intact. Another method might be to place a pyro-expanding mandrel between the nose cone collar and the missile body that would shear the mounting fasteners. In another possible scenario, the collar could be hinged with a solenoid, burn wire, or explosive bolt holding it together. Once released, simple springs could push the nosecone away from the flight vehicle.

Figure 10:
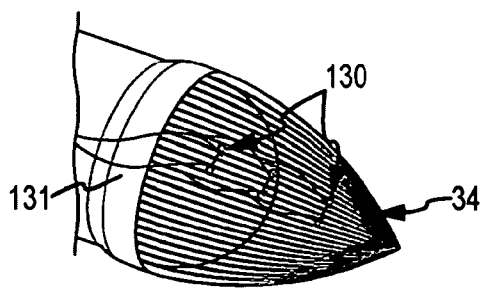
FIG. 10 is a diagram illustrating the use of burn wires to hold the nose cone together.

The embodiments depicted in FIGS. 10, 11a-b and 12 to shed the nose cone are based on using 'burn wires' to hold the structural wires together during flight. As shown in FIG. 10, in an embodiment burn wires 130 (e.g. Nichrome) are woven longitudinally and/or circumferentially around structural wires 34 with leads 131 back to a controller. Alternately, the burn wire may just tie the ends of the structural wires at the tip of the nose cone together. Burn wires largely need to constrain the skeleton in the tensile or outward direction although they will provide some integrity in the compressive direction or inward. To shed the nose cone, the controller generates an electrical current that ignites and disintegrates the burn wires thereby removing or at least reducing the structural integrity of the nose cone. The outer skin is 'scored' at multiple locations around the nose cone allowing the skin to part when the nose cone is shed. The controller generates another signal that causes the collar to separate and shed the nose cone. The burn-wire embodiments for shedding the nose cone may also be used with a non-collapsible nose cone. A solid nose cone could be configured using structural wires and an outer skin but using conventional non-SMA materials.

Figure 11A:
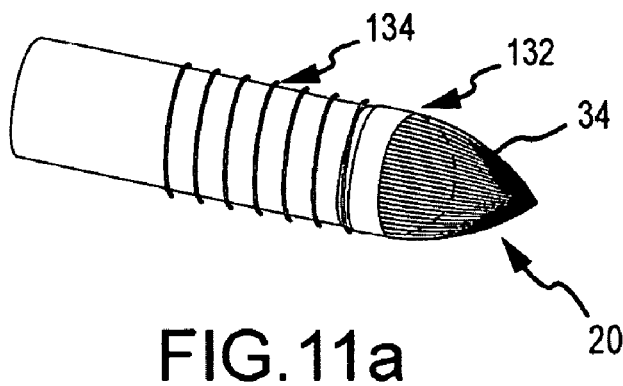
FIGS. 11a and 11b are diagrams of the deployed and retracted states of a collar used to shed the nose cone once the burn wires have been ignited.
Figure 11B:
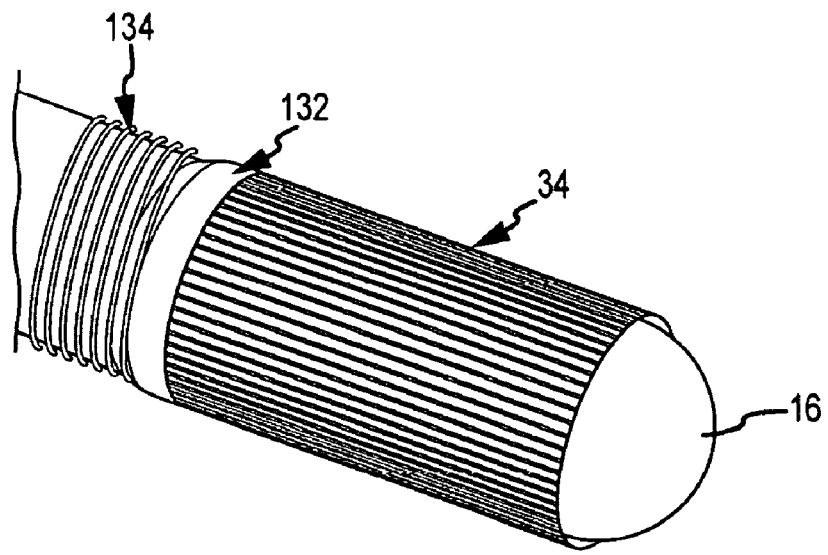

As shown in FIGS. 11a and 11b (without the outer skin), the aft end of the nose cone 20 is secured to a collar 132. For example, the ends of the structural wires 34 may be embedded around the circumference of the collar. The collar is attached, for example, to a helical spring 134 that is stretched and the collar clamped in place. In response to a signal from the controller, the collar is released allowing the helical spring to retract the collar pulling the structural wires 34 and outer skin (not shown) around and aft of the seeker dome 16. As the nose cone is retracted the structural wires will tend to straighten into a cone around the body of the flight vehicle and the outer skin will part along the scoring.

Figure 12:
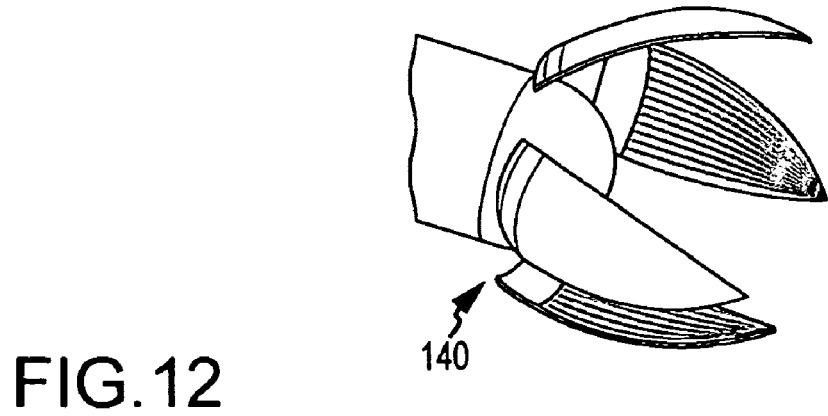
FIG. 12 is an embodiment of a segmented collar used to shed the nose cone.

As shown in FIG. 12, the aft end of the nose cone is secured to a segmented collar 140. For example, the ends of the structural wires may be embedded around the circumference of the collar in different segments. In response to a signal from the controller, pyro devices may blow each collar segment off with the attached structural wires causing the outer skin (not shown) to part along the scoring.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A nose cone assembly for covering a sensor dome of an air vehicle during flight, comprising a nose cone including an outer skin and a shape memory alloy (SMA) having a recoverable strain of at least 2% shape-set with a memorized shape having a radius of curvature greater than that of said sensor dome, said SMA collapsed to conform to the curvature of the sensor dome within the recoverable strain, and a mechanism that returns the collapsed SMA to its memorized shape to form the nose cone.

2. The nose cone assembly of claim 1, wherein said sensor dome is hemispherical with a ratio of the radius of curvature to a dome diameter of approximately one-half, said memorized shape of said SMA having a ratio greater than one-half.

3. The nose cone assembly of claim 1, wherein the collapsed SMA is twisted about a longitudinal axis through the sensor dome.

4. The nose cone assembly of claim 1, wherein said outer skin comprises said SMA.

5. The nose cone assembly of claim 1, wherein said nose cone includes:
   a collar mountable around and aft of the sensor dome;
   a plurality of structural wires formed of the SMA anchored at one end around the circumference of the collar to extend forward about the sensor dome shape-set to form a wire skeleton of the memorized shape; and
   said outer skin over the wire skeleton,
   said mechanism displacing the collar to shed the structural wires and outer skin away from the sensor dome.

6. The nose cone assembly of claim 5, wherein said outer skin is formed from said SMA.

7. The nose cone assembly of claim 1, wherein the SMA is shape-set in its Austenite phase and collapsed in its Martensite phase, said mechanism returning the SMA to its Austenite phase and memorized shape.

8. A nose cone assembly for covering a sensor dome of an air vehicle during flight, comprising:
   a collar mountable around and aft of the sensor dome;
   a nose cone including a plurality of structural wires formed of a shape memory alloy (SMA) anchored at one end around the circumference of the collar to extend forward about the sensor dome and shape-set to form a wire skeleton of a memorized shape having a radius of curvature greater than that of said sensor dome, an outer skin over the wire skeleton and one or more burn wires that hold the structural wires together, said wire skeleton collapsible to conform to the curvature of the sensor dome within a recoverable strain of at least 2% and recoverable to return to its memorized shape:
a first mechanism for igniting the burn wires in flight; and
a second mechanism for displacing the collar to shed the structural wires and outer skin away from the sensor dome.

9. The nose cone assembly of claim 8, wherein said second mechanism includes an actuator that retracts the collar about the air vehicle to pull the structural wires and outer skin aft of the sensor dome.

10. The nose cone assembly of claim 8, wherein said second mechanism segments and releases the collar and the structural wires anchored thereto.

11. A nose cone assembly for coving a sensor dome of an air vehicle during flight, comprising a nose cone including an outer skin and a shape memory alloy (SMA) having a recoverable strain of at least 2% shape-set with a memorized shape having a radius of curvature greater than that of said sensor dome, said SMA shape-set in its Austenite phase is collapsible at a storage temperature below the alloy's Martensite finish temperature in its Martensite phase to conform to the curvature of the sensor dome within the recoverable strain, and a first mechanism for heating the SMA above its Austenite finish temperature to return the alloy to its Austenite phase and memorized shape.

12. The nose cone assembly of claim 11, wherein said first mechanism comprises a reactive foil in thermal contact with the SMA and means for passing an electric current through said reactive foil.

13. A nose cone assembly for coving a sensor dome of an air vehicle during flight, comprising a nose cone including an outer skin and a shape memory alloy (SMA) having a recoverable strain of at least 2% shape-set with a memorized shape having a radius of curvature greater than that of said sensor dome, said SMA shape-set in its Austenite phase is collapsible at a storage temperature above the alloy's Austenite finish temperature placing the material in a strain-induced Martensite phase to conform to the curvature of the sensor dome within the recoverable strain, and a first mechanism for holding the collapsed SMA and releasing the SMA to return to its Austenite phase and memorized shape.

14. A method of protecting the dome of an air vehicle seeker assembly, comprising:
shape setting a shape memory alloy (SMA) in its Austenite phase with a memorized shape having a radius of curvature greater than that of the dome;
collapsing the SMA in its Martensite phase to conform to the radius of curvature of the dome;
storing the air vehicle in a tube;
launching the air vehicle into an atmosphere;
returning the collapsed SMA to its memorized shape to form a nose cone that protects the dome and reduces aerodynamic drag in atmosphere; and
displacing the nose cone to allow the seeker to image a scene through the dome.

15. The method of claim 14, wherein the SMA is twisted about a longitudinal axis through the dome and compressed to collapse the SMA.

16. The method of claim 14, further comprising:
shape setting a plurality of structural wires formed of the SMA around a circumference extending forward about the dome in the memorized shape;
placing the outer skin over the structural wires; and
anchoring the structural wires around the circumference with a collar mounted around and aft of the sensor dome.

17. The method of claim 14, wherein said SMA shape-set in its Austenite phase is collapsed at a storage temperature below the alloy's Martensite finish temperature in its Martensite phase, further comprising heating the SMA above its Austenite finish temperature to return the alloy to its Austenite phase and memorized shape.

18. The method of claim 14, wherein said SMA shape-set in its Austenite phase is collapsed at a storage temperature above the alloy's Austenite finish temperature placing the material in a strain-induced Martensite phase, further comprising holding the collapsed SMA and then releasing the SMA to return to its Austenite phase and memorized shape.

19. A method of manufacture of a protected seeker assembly, comprising
providing a seeker assembly including a dome having a first radius of curvature;
shape setting a shape memory alloy (SMA) at temperature in its Austenite phase with a memorized shape having a second radius of curvature greater than that of the dome forming a nose cone;
reducing the temperature to store the nose cone;
collapsing the nose cone in its Martensite phase to conform to the first radius of curvature of the dome; and
storing the seeker assembly and collapsed nose cone on an air vehicle in a launch tube.

20. The method of claim 19, wherein the SMA is twisted about a longitudinal axis through the dome and compressed to collapse the SMA.

21. The method of claim 19, further comprising:
shape setting a plurality of structural wires formed of the SMA around a circumference of the dome extending forward about the dome in the memorized shape:
placing an outer skin over the structural wires; and
anchoring the structural wires around the circumference of the dome with a collar mountable around and aft of the dome.

22. The method of claim 19, wherein said SMA shape-set in its Austenite phase is collapsed at a storage temperature below the alloy's Martensite finish temperature in its Martensite phase, further comprising heating the SMA above its Austenite finish temperature to return the alloy to its Austenite phase and memorized shape.

23. The method of claim 19, wherein said SMA shape-set in its Austenite phase is collapsed at a storage temperature above the alloy's Austenite finish temperature placing the material in a strain-induced Martensite phase, further comprising holding the collapsed SMA and then releasing the SMA to return to its Austenite phase and memorized shape.

24. A nose cone for protecting a sensor dome of an air vehicle during flight, comprising:
a collar mounted around and aft of the sensor dome;
a plurality of structural wires anchored at one end around the circumference of the collar and extending forward about the sensor dome to form a wire skeleton having a shape of a nose cone;
one or more burn wires that hold the structural wires together;
an outer skin over the structural wires;
a first mechanism for igniting the burn wires in flight; and
a second mechanism for displacing the collar to shed the structural wires and outer skin away from the sensor dome.

25. The nose cone of claim 24, wherein said second mechanism includes an actuator that retracts the collar about the air vehicle to pull the structural wires and outer skin aft of the sensor dome.

26. The nose cone of claim 25, wherein said second mechanism segments and releases the collar.

* * * * *

UNITED STATES PATENT AND TRADEMARK OFFICE
CERTIFICATE OF CORRECTION

PATENT NO. : 8,058,595 B2  
APPLICATION NO. : 12/141426  
DATED : November 15, 2011  
INVENTOR(S) : Koehler et al.

Page 1 of 1

It is certified that error appears in the above-identified patent and that said Letters Patent is hereby corrected as shown below:

In column 11, claim 11, line 19, delete "coving" and insert --covering--;

In column 11, claim 13, line 35, delete "coving" and insert --covering--.

Signed and Sealed this
Third Day of January, 2012

David J. Kappos
*Director of the United States Patent and Trademark Office*